United States Patent [19]

Weaver

[11] 3,888,941

[45] June 10, 1975

[54] MODIFIED ABS POLYMERS

[75] Inventor: Ebon Paul Weaver, Naugatuck, Conn.

[73] Assignee: Uniroyal, Inc., New York, N.Y.

[22] Filed: Feb. 26, 1974

[21] Appl. No.: 446,074

[52] U.S. Cl............................ 260/829; 260/876 R
[51] Int. Cl....................... C08f 31/04; C08f 39/00
[58] Field of Search............................ 260/829, 876

[56] References Cited
UNITED STATES PATENTS
2,785,143   3/1957   Edgerley............................ 260/829

*Primary Examiner*—Paul Lieberman
*Attorney, Agent, or Firm*—Thomas A. Beck, Esq.

[57] ABSTRACT

Blends resulting from the physical admixing of
- A. 100 parts of an acrylonitrile-butadiene-styrene interpolymer,
- B. 20 to 60 parts of an alkyl acrylate-butadiene-styrene terpolymer, and
- C. 5 to 25 parts of a coumarone-indene resin, wherein the weight ratio of (B) to (C) is at least 1 to 1, result in improved flexural fatigue resistance.

21 Claims, No Drawings

MODIFIED ABS POLYMERS

BACKGROUND OF THE INVENTION

FIELD OF THE INVENTION

This invention relates to synthetic thermoplastic resin compositions. More particularly, the invention relates to the resin blend which results from the physical admixing of A. 100 parts of an acrylonitrile-butadiene-styrene interpolymer (ABS), B. 20 to 60 parts of an alkyl acrylate-butadiene-styrene terpolymer, and C. 5 to 25 parts of a coumarone-indene resin, providing the weight ratio of (B) to (C) is at least 1 to 1.

SUMMARY OF THE INVENTION

There is need for reasonably priced plastic compounds with resistance to flexural fatigue which at the same time possess good flow characteristics and impact strength. The present invention relates to a novel combination of additives which markedly improve flexural fatigue resistance of ABS polymer. The composition of the present invention primarily provides improved fatigue strength which is important to applications where repeated strain loadings lead to premature failure as, for example, in shoe counters, seating, machine housings, luggage and the like.

The present invention provides polyblends containing preferably:

A. 100 parts of ABS gum plastic material,

B. 20 to 60 parts of a methylmethacrylate-butadiene-styrene terpolymer, and

C. 5 to 25 parts of a coumarone-indene resin, providing the weight ratio of (B) and (C) is at least 1 to 1.

The resulting blends exhibit unexpected thermoplastic properties including improved flexural fatigue resistance without substantially sacrificing desirable properties such as heat distortion temperature, impact strength and flexural modulus of unmodified ABS.

DESCRIPTION OF PREFERRED EMBODIMENT

The expression "ABS gum plastic " is used herein in its conventional sense to designate the known thermoplastic polymeric compositions containing combined acrylonitrile, butadiene, and styrene, also called ABS resins or ABS graft copolymers, described for example in U.S. Pat. Nos. 2,439,202, L. E. Daly, Apr. 6, 1948; 2,600,024, H. Romeyn, Jr. et al., June 10, 1952; 2,820,773, C. W. Childers, Jan. 21, 1958; 3,111,501, M. S. Thompson, Nov. 18, 1963; 3,198,853, R. L. Bergen, Jr., Aug. 3, 1965 and 3,261,887, J. U. Mann, July 19, 1966. As is well known to those skilled in the art, the ABS plastic may be of the graft copolymer type, or of the physical blend type (polyblend), or a combination of the two. The conventional ABS graft copolymers are made by graft copolymerizing resin-forming monomers, such as styrene and acrylonitrile, on a previously prepared polybutadiene rubber spine, or a butadiene-styrene copolymer rubber spine; in the final graft copolymer the resinous portion and the rubbery portion are in part chemically combined. The so-called graft copolymer in actual practice contains some ungrafted resin, that is, not all of the resin-forming monomers become grafted to the rubbery spine polymer in the course of the graft polymerization process. The graft copolymer may be made by an emulsion polymerization technique, in which a previously prepared latex of polybutadiene or similar rubber, which serves as a spine, is subject to emulsion polymerization conditions with a monomeric mixture of styrene and acrylonitrile emulsified therein. Alternatively, graft copolymer may be prepared by solution polymerization methods, or by so-called bulk-suspension technique. On the other hand, the physical blend type of ABS is typically a mixture of butadiene-acrylonitrile rubber with separately prepared styrene-acrylonitrile resin. Frequently the graft polymer type of ABS includes additional separately prepared styrene-acrylonitrile resin blended with the graft copolymer. Moreover, if desired, other styrene-type monomer (such as alpha-methylstyrene) may be substituted for some or all of the styrene itself, and other acrylic monomers (such as methacrylonitrile, ethyl acrylate, methyl methacrylate) may be substituted for some of the acrylonitrile-type monomer.

Since the ABS material has both a rubbery component (e.g. polybutadiene or butadiene-styrene spine or butadiene-acrylonitrile copolymer component) and a resinous component (styrene-acrylonitrile), it may therefore be regarded as a "gum plastic" type of material. Usually the proportion of the rubber component in the ABS is from 5 to 35 percent, while the proportion of resin is correspondingly from 95 to 65 percent. The overall proportion of acrylonitrile, butadiene and styrene-type monomer usually falls within the ranges: 10 to 40 percent acrylonitrile; 5 to 65 percent butadiene; and 25 to 85 percent styrene.

The M. S. Thompson U.S. Pat. No. 3,111,501, referred to above as disclosing ABS resins of the kind employed in the invention, is directed to the type of ABS made by blending alpha-methylstyrene-acrylonitrile resin with a graft copolymer of styrene and acrylonitrile on polybutadiene. Thus, for example, there may be employed in this invention the compositions made by blending alpha-methylstyrene/acrylonitrile resin (69/31) (Thompson, col. 2, lines 34–35) with a graft copolymer of styrene/acrylonitrile (70/30 ratio) monomers on polybutadiene latex (46 percent styrene-acrylonitrile and 54 percent rubber solids)(Thompson, col. 3, lines 32–37). Thompson also discloses, at col. 1, lines 68–70, that some or all of the styrene in the graft copolymer may be replaced by alpha-methylstyrene. Likewise, Mann U.S. Pat. No. 3,261,887, col. 5, lines 48, 49; col. 10, Tables 6 and 7; col. 11, lines 50, 51, 54, 55, discloses alpha-methylstyrene as the comonomer with butadiene to make alpha-methylstyrene-butadiene copolymer spine for grafting, while Grabowski U.S. Pat. No. 3,130,177, col. 4. lines 13–15, discloses replacement of the styrene, in part or entirely, by alpha-methyl-styrene, in the preparation of the graft copolymer. Similarly, the R. L. Bergen, Jr., U.S. Pat. No. 3,198,853 referred to previously shows ABS containing graft copolymer of styrene and acrylonitrile on polybutadiene blended with separately prepared resinous copolymer of alpha-methylstyrene and acrylonitrile. Thus, at column 2, lines 39–42, Bergen, Jr., discloses blending the graft copolymer with a separately prepared resinous copolymer of styrene or alpha-methylstyrene and acrylonitrile. At column 4, lines 6–12, Bergen, Jr., discloses a blend of 35 parts of a graft copolymer of 50 parts of styrene and acrylonitrile (ratio 70/30) on 50 parts of polybutadiene rubber, blended with 65 parts of separately prepared resinous copolymer of alpha-methylstyrene and acrylonitrile (ratio 69/31). Any such types of ABS may be employed in this invention.

The preferred graft polymers used in the present invention contain 26–34% acrylonitrile or substituted acrylonitrile, 5–25% butadiene and 41–69% styrene or alpha-methylstyrene.

The coumarone-indene resins with which the present invention is concerned may generally include those resins obtained through the catalytic polymerization of coal-tar naphthas. Such coal-tar naphthas contain resin-forming materials, for example, styrene, coumarone, indene, methyl coumarones, methyl indenes, dimethylcoumarones, dicyclopentadiene, methyl cyclopentadienes, cyclohexadienes, naphthalene and anthracene derivatives.

Polymerization of the aforesaid resin-forming materials is effected by the catalytic action of a Bronsted acid, such as sulfuric acid or a derivative thereof, or of a Lewis acid, such as stannic chloride, antimony pentachloride, aluminum chloride, titanium tetrachloride, or boron trifluoride, on the coal tar naphthas. The polymers, generally, are not homopolymers, but are derived from mixtures of several resin-forming materials. The polymers may also be condensed with phenol and derivatives thereof, or with lower aliphatic aldehydes such as formaldehyde, or may be hydrogenated to remove residual unsaturation. The hydrocarbon resins as described above, and in, for example, chapter 3 of the book, *Synthetic Resins and Rubbers*, by P. O. Powers, are well known to those skilled in the art, being commonly used in the plasticization of rubbers, and in manufacture of varnishes and paints. Such hydrocarbon resins are readily available on a commerical basis and include, for example, the polyindenes, polycoumarones, coumarone-indene polymers, phenol modified coumarone-indene polymers, coumarone-indene-styrene polymers, styrene-cyclopentadiene polymers, styrene-indene polymers, dicyclopentadiene resins, terpene resins, napthalenic resins, anthracenic resins, etc.

The preferred coumarone-indene resins used in the present invention contain 92–96% indene. The resins have a molecular weight range between 100 and 550, preferably between 120 and 250.

The other additive polymer which is blended with the ABS and coumarone-indene resin is an interpolymer of alkyl acrylates, butadiene and styrenes, preferably a graft derivative of a butadiene-containing polymer spine. The butadiene-containing polymer spine may be polybutadiene or poly(butadiene-styrene)(either random or block).

Monomers that can be grafted on to the spine are methacrylates such as methyl methacrylate, ethyl methacrylate and the alkenyl aromatic compounds such as styrene and methylstyrene.

Any of the methods for preparing the graft polymers found in *Graft Copolymers* by Battaerd and Tregaer, N.Y. Interscience, 1967, may be used to prepare the graft polymers of the present invention.

Preferably methyl methacrylate-butadiene-styrene (MBS) polymers are used in the present invention. Generally, said MBS contains 65–82% methyl methacrylate, 10–20% butadiene and 8–15% styrene, preferably 69–75% methyl methacrylate, 15–18% butadiene and 8–15% styrene.

To prepare the blend of the invention, the three starting polymers, namely, the ABS resin matrix, coumarone-indene resin and MBS may be mechanically blended together in the desired proportions with the aid of any suitable mixing device conventionally used for mixing rubbers or plastics, such as a differential roll mill, a Banbury mixer, or an extruder. In order to facilitate thorough mixing of the polymers and to develop the desired improved combination of physical properties, the mechanical blending is carried out at sufficiently high temperatures to soften the polymers so that they are thoroughly dispersed and intermingled with each other. The mixing temperature will in general vary with the composition of the blend; usually the ABS, will govern the mixing temperature selected. Mixing is continued until a uniform blend is obtained.

Alternatively the ABS and MBS may be latex blended, coflocculated, dried and mechanically blended with the coumarone-indene resin.

There are various advantages which result from blending the ABS, coumarone-indene resin, and MBS. One important advantage is the excellent flex fatigue resistance of the material. The flex fatigue resistance is substantially improved when compared to the unmodified ABS. For the purposes of the present invention, the flex fatigue resistance is expressed in terms of the number of flexures of a standard size sample to failure. The test for determining the number of flexures to failure is conducted by forming standard ASTM tensile bars as specified in their specification number D-638-61T by injection molding. The actual procedure for conducting the flex fatigue resistance test is described in detail hereinafter in Example 6.

The blends of this invention may contain certain other additives to plasticize, extend, lubricate, inhibit or prevent oxidation. Flame retardants, dyes, pigments, etc., may also be added to the mixtures. Such additives are well known in the art and may be incorporated without departing from the scope of the invention. Examples 1 to 6 are included to illustrate in detail the advantages of the present invention.

EXAMPLE 1

Thirty-eight and one half (38.5) parts of MBS (methyl methacrylate-butadiene-styrene-73/16/11) polymer were added to 100 parts of ABS (acrylonitrile-butadiene-styrene) resin comprising 65 parts of a (74/26) styrene-acrylonitrile resin combined with 35 parts of a graft interpolymer which comprises 50 parts of a (68/32) styrene-acrylonitrile monomer mixture grafted onto 50 parts of a (10/90) styrene-butadiene rubber.

The ABS and MBS polymers were blended and brought to flux in a Banbury, (about 250°F.) whereupon 15.4 parts of coumarone-indene resin (which contained between 92–96% indene and which had a softening point between 28° and 38°C) were added to the mixture and blending was continued to a temperature of 380°F. (or about 3 minutes).

The three component blend was then removed from the Banbury, placed on a two roll mill at 300°F. to form a sheet which was cooled, and then chopped into pellet form. The pellets were injection molded to form finished test bars using the procedure found in ASTM D-638-61T.

EXAMPLE 2

Test bars were prepared using the composition and procedures described in Example 1 except that the coumarone-indene resin had a softening point of 50°–66°C.

EXAMPLE 3

Test bars were prepared using the polymers and method described in Example 1 except that the ABS resin had a ratio of 50 parts of the (74/26) styrene-acrylonitrile resin to 50 parts of the (68/32) styrene-acrylonitrile monomer mixture grafted onto the (10/90) styrene-butadiene rubber.

EXAMPLE 4

Test bars were prepared using the composition and method described in Example 3 except that the coumarone-indene resin had a softening point of 50°–66°C.

EXAMPLE 5

Test bars of the unmodified ABS resins described in Examples 1 and 3 were prepared using the procedure found in ASTM D-638-T.

EXAMPLE 6

The test bars prepared in Examples 1–5 were conditioned to and tested at 73°F. and 50% relative humidity for flex fatigue resistance according to the following test procedure:

In each case, one end of the bar was mounted on a mounting block so that the bar extends out horizontally from the block a distance of about 14.6 cm. The unmounted end of the bar is positioned between an upper and lower roller cam set which is mounted eccentrically on a rotating wheel driver which operates at a speed of 60 to 70 rpm. The roller cams are rotatably mounted so that the axis between said cams remains essentially normal to the bar through a complete revolution of the wheel. As the rotating wheel goes through a full revolution, the bar is first deflected downward to a maximum position so that the point of contact of the upper roller with said bar is located about 8 cm. from the end of the mounting block along the neutral axis and downward about 4.5 cm. from said neutral axis. As rotation continues, the bar passes through the neutral plane to a maximum upward deflection so that the point of contact of said lower roller with said bar is located about 8 cm. from the end of the mounting block along the neutral axis and upward about 2.8 cm. from said neutral axis. The flexing of the bar is continued until there is complete fracture of the bar.

Other properties of the material were measured according to the procedures disclosed in the following ASTM tests: heat distortion temperature (ASTM D648-56); notched izod impact (ASTM D256-56); tensile strength and tensile modulus (ASTM D638-61T).

Table I gives the results of these tests.

TABLE I

| | Ex. 5 | Ex. 1 | Ex. 2 | Ex. 5 | Ex. 3 | Ex. 4 |
|---|---|---|---|---|---|---|
| ABS (65/35)[1] | 100 | 100 | 100 | | | |
| ABS (50/50)[2] | | | | 100 | 100 | 100 |
| MBS[3] | | 38.5 | 38.5 | | 38.5 | 38.5 |
| Coumarone-Indene[4] | | 15.4 | | | 15.4 | |
| Coumarone-Indene[5] | | | 15.4 | | | 15.4 |
| HDT at 264 psi Annealed 16 hrs-120°F. | 197 | 182 | 179 | 193 | 174 | 176 |
| ¼" Notched Izod 73°F. | 4.0 | 6.0 | 6.2 | 3.7 | 6.0 | 5.7 |
| Tensile Strength | 6340 | 4920 | 4900 | 6310 | 4570 | 4580 |
| Tensile Modulus × $10^{-5}$ | 5.1 | 3.6 | 3.6 | 4.0 | 2.7 | 3.0 |
| Flex Fatigue Fail × $10^{-3}$ | 40.9 | 237 | 317 | 17 | 97 | 152.6 |

[1] The ABS resin described in Example 1
[2] The ABS resin described in Example 3
[3] The MBS described in Example 1
[4] The coumarone-indene resin described in Example 1
[5] The coumarone-indene resin described in Example 2

Table I clearly shows that the addition of the MBS and coumarone-indene resins to ABS substantially increases the flexural fatigue failure (number of flexures to break) when compared with the unmodified ABS resin while maintaining the heat distortion temperature, impact strength, tensile strength and tensile modulus at acceptably high levels.

What I claim and desire to protect by Letters Patent is:

1. A thermoplastic polymer blend having improved flex fatigue resistance comprising
   A. 100 parts of an acrylonitrile-butadiene-styrene interpolymer comprising styrene-acrylonitrile resin combined with a styrene-acrylonitrile monomer mixture grafted onto a rubber spine selected from polybutadiene and butadiene-styrene copolymer, wherein said interpolymer comprises 10–40% acrylonitrile monomer, 5–65% butadiene monomer, and 25–85% styrene monomer, all by weight;
   B. 20 to 60 parts of an alkyl acrylate-butadiene-styrene terpolymer; and
   C. 5 to 25 parts of a coumarone-indene resin, wherein the weight ratio of (B) and (C) is at least 1 to 1.

2. The thermoplastic polymer blend defined in claim 1, wherein component (B) is present at a concentration of from 25 to 50 parts, and component (C) is present at a concentration of from 10 to 20 parts per 100 parts of said component (A).

3. The thermoplastic polymer blend as defined in claim 1, wherein the acrylonitrile in the component (A) is selected from acrylonitrile and methacrylonitrile, and the styrene is selected from styrene and alpha-methylstyrene.

4. The thermoplastic polymer blend as defined in claim 3, wherein the component (A) comprises 26–34% acrylonitrile monomer, 5–25% butadiene monomer, and 41–69% styrene monomer, all by weight.

5. The thermoplastic polymer blend as defined in claim 1, wherein component (B) comprises 65–82% methyl methacrylate monomer, 10–20% butadiene monomer and 8–15% styrene monomer, all by weight.

6. The thermoplastic polymer blend as defined in claim 5, wherein component (B) comprises 69–75% of methyl methacrylate, 15–18% butadiene and 8–15% styrene, all by weight.

7. The thermoplastic polymer blend as defined in claim 1, wherein component (C) is 92–96% indene.

8. The thermoplastic polymer blend as defined in claim 7, wherein component (C) has a molecular weight between 100 and 550.

9. The thermoplastic polymer blend as defined in claim 7, wherein component (C) has a molecular weight between 120 and 250.

10. The thermoplastic polymer blend as defined in claim 1, wherein component (A) comprises 26–34% acrylonitrile monomer, 5–25% butadiene monomer, and 41–69% styrene monomer, all by weight; component (B) comprises 65–82% methyl methacrylate monomer, 10–20% butadiene monomer and 8–15% styrene monomer, all by weight; and component (C) comprises 92–96% indene by weight.

11. The thermoplastic polymer blend defined in claim 10, wherein component (A) comprises styrene-acrylonitrile resin combined with a styrene-acrylonitrile monomer mixture grafted onto a rubber spine selected from polybutadiene and butadiene-styrene copolymer.

12. The thermoplastic polymer blend as defined in claim 11, wherein the acrylonitrile in the component (A) is selected from acrylonitrile and methacrylonitrile, and the styrene is selected from styrene and alpha-methylstyrene.

13. The thermoplastic polymer blend defined in claim 12, wherein an equal weight of styrene-acrylonitrile resin is combined with the graft copolymer.

14. The thermoplastic polymer blend defined in claim 12, wherein 95 to 65 parts by weight of styrene-acrylonitrile resin are combined with 5 to 35 parts by weight of the graft copolymer.

15. The thermoplastic polymer blend defined in claim 2, wherein component (A) comprises 26–34% acrylonitrile monomer, 5–25% butadiene monomer, and 41–69% styrene monomer, all by weight; component (B) comprises 69–75% methyl methacrylate monomer, 15–18% butadiene monomer and 8–15% styrene monomer, all by weight; and component (C) comprises 92–96% indene by weight.

16. The thermoplastic polymer blend defined in claim 15 wherein component (A) comprises styrene-acrylonitrile resin combined with a styrene-acrylonitrile monomer mixture grafted onto a rubber spine selected from polybutadiene and butadiene-styrene copolymer.

17. The thermoplastic polymer blend defined in claim 16, wherein the acrylonitrile in the component (A) is selected from acrylonitrile and methacrylonitrile, and the styrene is selected from styrene and alpha-methylstyrene.

18. The thermoplastic polymer blend defined in claim 17, wherein an equal weight of styrene-acrylonitrile resin is combined with the graft copolymer.

19. The thermoplastic polymer blend defined in claim 17 wherein 65 parts by weight of styrene-acrylonitrile resin are combined with 35 parts by weight of the graft copolymer.

20. The thermoplastic polymer blend as defined in claim 18, wherein 100 parts of a (74/26) styrene-acrylonitrile resin combined with a (68/32) styrene-acrylonitrile monomer mixture grafted onto a (10/90) styrene-butadiene rubber; component (B) comprises 38.5 parts of a (73/16/11) methyl methacrylate-butadiene-styrene interpolymer; and component (C) comprises 15.4 parts of a coumarone-indene resin containing about 92–96% indene.

21. The thermoplastic polymer blend as defined in claim 19, wherein 100 parts of a (74/26) styrene-acrylonitrile resin combined with a (68/32) styrene-acrylonitrile monomer mixture grafted onto a (10/90) styrene-butadiene rubber; component (B) comprises 38.5 parts of a (73/16/11) methyl methacrylate-butadiene-styrene interpolymer; and component (C) comprises 15.4 parts of a coumarone-indene resin containing about 92–96% indene.

* * * * *